Edward Duffee's Gas Screen.
No. 121,764.   Patented Dec. 12, 1871.
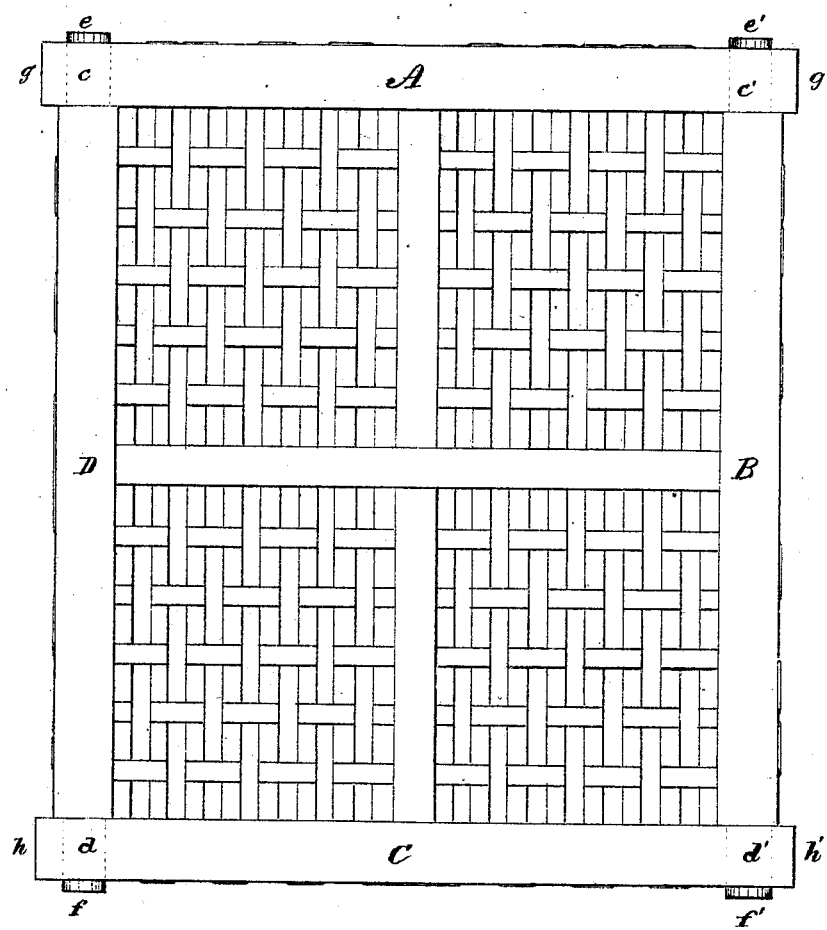
Witnesses.
F. C. Hale,
Wm Turner
E. Duffee.
by his attorney
F. V. Hale

UNITED STATES PATENT OFFICE.

EDWARD DUFFEE, OF HAVERHILL, MASSACHUSETTS.

IMPROVEMENT IN SCREENS FOR COAL-GAS PURIFIERS.

Specification forming part of Letters Patent No. 121,764, dated December 12, 1871.

*To all whom it may concern:*

Be it known that I, EDWARD DUFFEE, of Haverhill, in the county of Essex and State of Massachusetts, have invented an Improved Screen for Coal-Gas Purifiers; and do hereby declare the same to be fully described in the following specification and represented in the accompanying drawing, which denotes a top view of a screen constructed in accordance with my invention.

My said invention has reference to that class of screens composed of thin strips or layers of wood, so crossed or interlaced as to leave openings between their points of junction, the said strips being secured to a wooden frame; and my invention consists in a peculiar mode of constructing the said frame and reeving the said strips, whereby the manufacture of the said screen is rendered simpler and cheaper.

In the said drawing, A B C D denote the four bars constituting the frame, $a$ $b$ being the cross-bars thereof. Each of the said top and bottom bars A C is formed with circular holes $c$ $c'$ $d$ $d'$ extending transversely through it and near each end thereof, the same being to receive cylindrical tenons $e$ $e'$ $f$ $f'$, formed respectively on each end of the bars B D, as shown in the drawing. Each of these tenons extends somewhat beyond the face of the bar through which it passes, in order to form abutments or shields to protect the looped portions of the strips reeved through the said bars from abrasion or injury. Furthermore, each of the said bars A C have their outer ends extending beyond the face of the bars with which they are connected a distance a little greater than the thickness of the strips reeved through the said bars, the object of such extensions $g$ $g'$ $h$ $h'$ also being to protect the projecting looped ends of the strips from wear or abrasion. Each of the said bars has a series of holes made transversely through it, the thin strips being reeved through such and interlaced at right angles, the looped ends of such projecting beyond the outer faces of the bars, as seen in the drawing.

The screens so made are to be used in a purifying-box of the kind shown in Letters Patent No. 56,490, and granted to me July 17, 1866, the same being arranged side by side in tiers, each tier to be covered with a layer of lime of greater or less thickness, as may be desirable.

The old method of putting the frame together was by means of square tenons and mortises and confining the bars together by means of pins. The round hole and the cylindrical tenon are more quickly formed than any other-shaped hole and tenon, while the lengthened tenons and projecting ends of the frame form simple and effective means of preventing abrasion of the loops of the strips while the screen is in use.

What I claim as my invention is as follows:

In a screen for dry coal-gas purifiers, composed of crossed or interlaced thin strips of wood reeved through and supported by a wooden frame, as shown and described, forming the bars A and C with projecting abutments, and the bars B D with extensions, as and for the purpose set forth.

EDWARD DUFFEE.

Witnesses:
JNO. A. APPLETON,
B. L. BATCHELDER.

(66)